Aug. 27, 1957  T. E. DADSON  2,804,531
RANGE
Filed Oct. 30, 1952  2 Sheets-Sheet 1
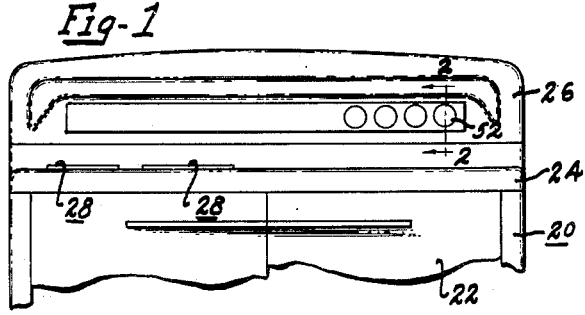
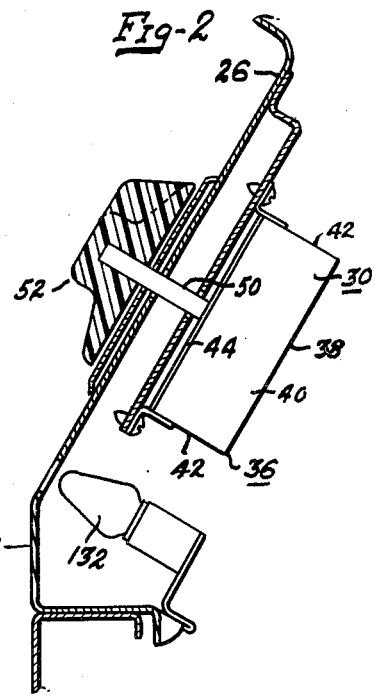
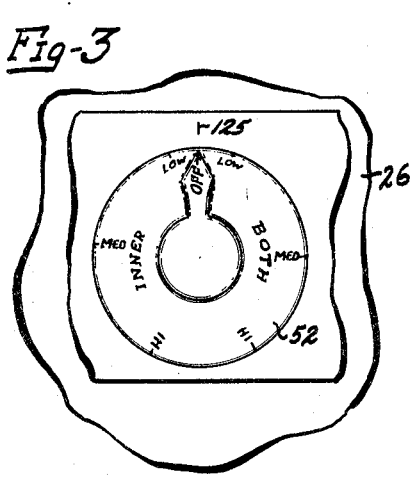
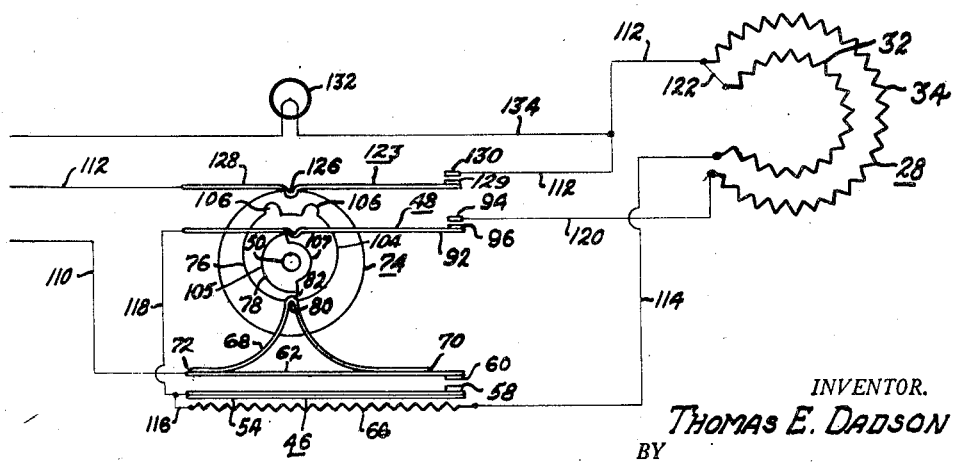
INVENTOR.
THOMAS E. DADSON
BY
Ralph E. Baker
ATTORNEY Aug. 27, 1957 T. E. DADSON 2,804,531
RANGE
Filed Oct. 30, 1952 2 Sheets-Sheet 2
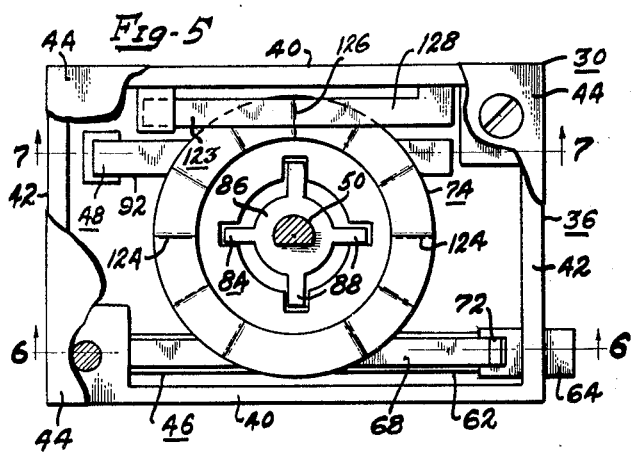
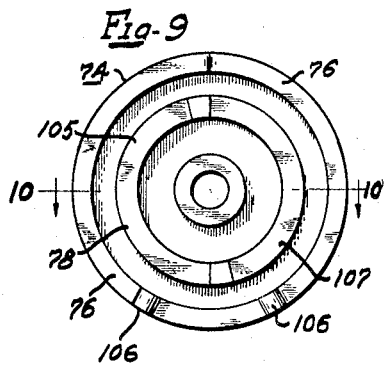
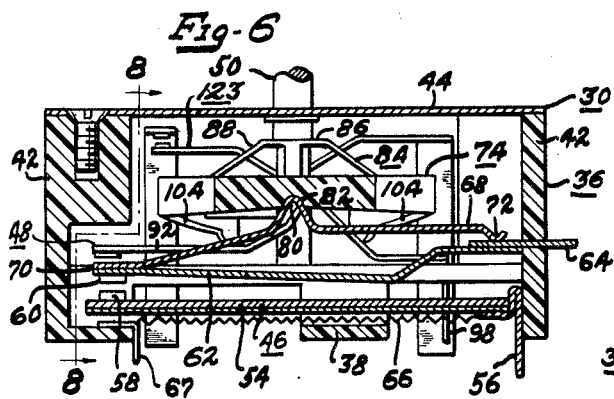
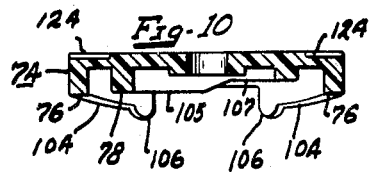
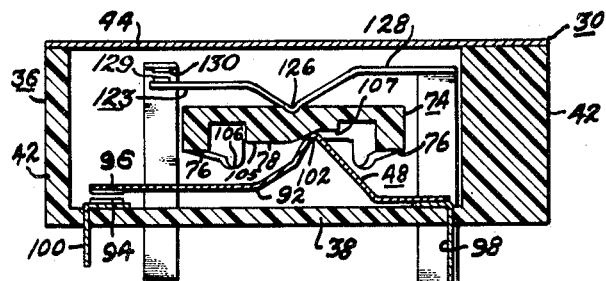
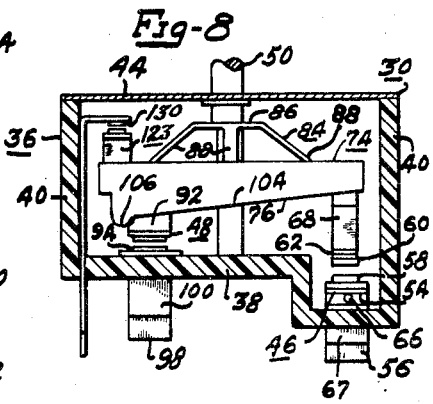
INVENTOR.
THOMAS E DADSON
BY
Ralph E. Baker
ATTORNEY

United States Patent Office 2,804,531
Patented Aug. 27, 1957

2,804,531

RANGE

Thomas E. Dadson, Detroit, Mich., assignor to Nash-Kelvinator Corporation, Detroit, Mich., a corporation of Maryland Application October 30, 1952, Serial No. 317,721

2 Claims. (Cl. 219—20)

This invention relates to electric ranges and particularly electric circuits therefor and the control of said circuits.

One of the objects of my invention is to provide an electric circuit for electric ranges in which the control of inner and outer circuit surface units is provided for in a new and improved manner.

Another object of my invention is to provide for electric cooking ranges having inner and outer surface unit heat rings, an improved heat selector control to control heat intensity of either the inner ring alone or both rings together.

Another object of the invention is to provide for an electric, two section surface cook unit, an improved cycling type heat selector control which is adapted to obtain an infinite number of heat intensities between high and low limits either in one or in both sections of the unit at the will of a user.

Another object of the invention is to provide an improved control for the above mentioned purpose of a character such that one section of the electric cook unit may be deenergized while at the same time setting the control to maintain any of the infinite positions to obtain corresponding infinite heat intensities in the other heat element section.

Another object of the invention is to provide an improved control of the above mentioned character in which cams on a single rotatable control knob function to control heat intensities of both rings when rotated in one direction from an "off" position and cuts out control of the outer ring when rotated in the opposite direction.

Another object of the invention is to provide an improved cooking unit heat selector control in which an indexing mechanism element for the heat intensity control switch also functions as a safety cut-off switch and signal light control.

Further objects and advantages of the present invention will be apparent from the following description, reference being had to the accompanying drawings, wherein a preferred form of the present invention is clearly shown.

In the drawings:

Fig. 1 is a fragmentary front view of an electric range embodying features of my invention;

Fig. 2 is a view taken along line 2—2 of Fig. 1;

Fig. 3 is a fragmentary view in elevation showing one of the range control knobs;

Fig. 4 is a diagrammatic illustration of a cooking range control system, embodying features of my invention;

Fig. 5 is a plan view of my control having the casing thereof broken away to show certain details of the device;

Fig. 6 is a view taken along line 6—6 of Fig. 5;

Fig. 7 is a view taken along line 7—7 of Fig. 5;

Fig. 8 is a view taken along line 8—8 of Fig. 6;

Fig. 9 is an elevational view of adjustment cams for the control; and

Fig. 10 is a view taken along line 10—10 of Fig. 9.

Referring to the drawings by characters of reference and particularly to Fig. 1, there is shown a cooking apparatus or electric range 20 which has the conventional lower oven structure 22, top 24, and back flange 26. On the range top 24 is a number of so-called electric surface heat units 28, and mounted on and behind flange 26 is a number of my improved controls 30 for respectively and individually controlling the surface heat units 28.

Each of the surface heat units 28 has two sections or pair of electric heat elements or resistances 32, 34 which are usually ring-like and concentric as shown in Fig. 4. As is well known, the double ring unit is provided to accommodate efficiently, cooking vessels or pans of different size since small pans may only require use of the inner or smaller ring 32 whereas larger pans may require use of both rings for proper distribution of heat over the pan bottoms.

Referring specifically to my improved control device 30, the device has a supporting means or casing 36 which may be box-shaped having a bottom wall 38, side walls 40, end walls 42, and a removable top or cover plate 44. Within the casing 36, adjacent bottom wall 38, there is a control or thermostat 46 and a modifying control or switch 48. Thermostat 46 is a manually adjustable cycling type of control which is operable to obtain in the cook unit a desired heat intensity by controlling or determining the average wattage input to the unit. By adjusting the cycling time of operation of the thermostat, low or high heat or any one of an infinite number of heat intensities therebetween may be had. Switch 48 is a normally open switch by means of which a user may select to use or energize only the inner surface unit ring 32, or may select to use both of the rings 32, 34. The controls 46, 48 are laterally positioned within the casing 36 and extending upwardly between them is an operating and control adjustment stem 50 which projects out of the casing through cover plate 44 to receive an operating knob 52.

The thermostat 46 has a bi-metal blade 54 which has one end thereof fixed to a terminal 56 which in turn is secured to the casing 36 (see Fig. 6). The other end of the bi-metal blade 54 is free or unattached and carries a contact 58 which cooperates with a contact 60 to control flow of current to the inner ring 32 or to both the inner ring 32 and outer ring 34, as the case may be. Contact 60 is fixed to one end of a spring blade 62 which is spaced directly above and extends longitudinally of the bi-metal blade 54. Blade 62 is fixed at one end thereof to a terminal 64 which in turn is secured in, and to one, of the casing end walls 42.

A resistance heater 66 is provided to influence operation of bi-metal blade 54 and is intermittently energized under control of the bi-metal switch blade 54. The heater 66 is located beneath and adjacent blade 54 and when energized causes blade 54 to bow and move contact 58 away from contact 60, thus opening the circuits both of the surface unit and the heater 66. As the blade cools it moves contact 58 into engagement with contact 60 to again energize the surface unit and the heater. One end of heater 66 is connected to terminal 56 and the other end of the heater is connected to a terminal 67.

The blade 62 is spring loaded by a leaf spring 68 and the thermostat may be set to acquire a desired heat by changing the time period of cycling of the bi-metal blade 54 which is accomplished by changing the tension of spring 68. Such adjustment of spring 68 changes the distance between contacts 58, 60 which correspondingly changes the thermostat cycling time and therefore the cooking element heat intensity. Spring 68 is disposed above and extends longitudinally of switch blade 62 and has one end secured, as at 70, to the free end of the blade and the other end, as at 72, bearing against the upper surface of terminal 64.

A rotatable cam carrier 74, fixed to the operating stem 50, is provided above the switch loading spring 68, and on the underside of the cam carrier member is a pair of annular concentric cams 76, 78. Cam 76 functions to set the thermostat 46 by changing the tension of spring 68, and cam 78 functions to actuate control switch 48. Intermediate its ends, the switch loading spring 68 has an upwardly bent portion 80 which engages and rides on cam 76 as a low friction follower that is adapted also to lodge in a recess 82 in the cam which corresponds to "off" position of the control. It will be seen that the cam 76 is so designed that rotation thereof in either direction from "off" position will increase the tension of loading spring 68 and that this will correspondingly increase the period that the thermostat allows current to flow to the heating unit with corresponding increase in heat intensity at the surface cooking unit.

Above the cam carrier 74, a thrust member or spring 84 is provided and arranged to keep cam 76 in engagement with the spring cam follower portion 80. The spring 84 has a base 86 which is apertured centrally thereof to receive the cam operating stem 50 and to seat against a downwardly facing abutment shoulder on the stem. Extending outwardly and downwardly from the spring base 86 is a number of radially spaced spring fingers 88 which are tensioned against the upper surface of cam carrier 74 to urge the carrier toward the loading spring 68.

The normally open switch 48 comprises a spring blade 92 and a fixed contact 94. As shown, blade 92 is biased to open circuit position and may be closed by being pressed downwardly by the inner cam 78. One end of blade 92 is free and carries a contact 96 which is cooperable with fixed contact 94 to control the circuit of the outer ring 34. Terminals 98, 100 are provided respectively for blade 92 and contact 94 and are secured to one side wall of casing 36. Intermediate its ends, switch blade 92 has an upwardly extending bent portion 102 which provides a low friction cam follower to engage and follow the surface of cam 78.

With particular reference to the design of cam 76, it will be seen that the cam has a gradually inclined cam surface 104 arranged such that rotation of the knob in either direction from "off" position initiates operation of and sets thermostat 46. Different heat intensities of any infinite number may be had by rotating the cam carrier 74 to change the force exerted by the thermostat loading spring 68. At the high point of each of the gradual cam inclinations 104, there is an abrupt rise 106 which when brought to bear against the thermostat loading spring 68 holds thermostat contacts 58, 60 in engagement against the action of bi-metal blade 54 as said blade has a limited movement insufficient to part the contacts in high position of the cam. Thus, when either of the cam portions 106 are against the loading spring 68, cycling of the thermostat 54 is deterred and a maximum high intensity heat at the heating unit is obtained. In cooperation with the design of cams 78, cam 76 has high and low cam surface portions 105, 107 respectively for allowing switch 48 to remain open for approximately a 180 degree turn of the cam in one direction and to allow the switch to close and remain closed for substantially the remaining 180 degree turn of the cam in the opposite direction.

A main electric lead 110 connects to switch blade 62, and a second main lead 112 connects to one end of the heating element inner ring 32. The other end of the inner ring 32 is connected by a lead wire 114 to the terminal 67 of thermostat heater 66 which has its opposite end connected by lead wire 116 to the thermostat bi-metal blade 54 at terminal 56. Connecting bi-metal blade 54, switch blade 48, and one terminal of the outer element ring 34 are lead wires 118 and 120. The other terminal of the outer element ring 34 is connected by a lead wire 122 to the corresponding end of the inner element ring 32 and thus connects to main lead 112. It will be seen that bi-metal blade 54, heater 66 and inner ring 32 are in series circuit relationship. The circuit through the ring 32 when cam follower 74 is moved in counterclockwise position is line 112, switch 123 including blade 128 thereof when contacts 129 and 130 are closed, lead 122, ring 32, line 114, heater 66, blade 54, contacts 58 and 60, blade 62 and line 110. Contacts 129 and 130 are closed upon movement of cam carrier 74 in either direction from "off" position.

On the upper surface of the cam carrier 74, a number of radially disposed locating notches 124 (see Fig. 5) is provided to receive a downwardly extended portion or locator 126 of a flexible blade 128. The notches 124 and locator 126 constitute an indexing mechanism in which the notches correspond to certain settings of the control so that a user can conveniently turn the cam carrier 74 to the proper position to obtain certain desired heat element intensities. When cam carrier 74 is moved in either direction from "off" position the blade 128 is moved upwardly to close contacts 129 and 130. It will be understood that while the notches 124 conveniently locate certain of the more commonly used control setting positions, such as "off," "low," "medium," etc. they do not limit the user to said positions as it is possible to select any of an infinite number of positions between adjacent notches.

On the face of the operating knob 52, a dial is preferably provided for the convenience of the user and may have any suitable indicia or markings to correspond to different heat intensities. In the present control, the dial indicates the "off," "high," "low," and "intermediate" positions, and also indicates the direction to turn the dial in order to select use of the inner ring 32 alone or both rings 32, 34. A fixed mark, such as line 125, may be provided on the range structure as a guide to the user in setting the control i. e. to obtain a certain heat, the knob is rotated to bring the indicia thereon corresponding to said heat in registration with line 125.

In addition to functioning as a locator of an indexing mechanism, the flexible blade 128 carries the cut-off or safety switch 123 which further functions as the control for an "on" and "off" signal light 132. Blade 128 is a normally open switch in main line 112 which on its free end carries the contact 129 that cooperates with the fixed contact 130 in the line 112 to control the circuit. Light bulb 132 is connected to line 112 by a lead 134 between the switch 126 and the heating elements 32, 34. In Fig. 4, it is illustrated that when the cam carrier 74 is moved to "off" position, indexing arm 128 engages in a notch on the upper surface of carrier 74 to allow the switch 123 to open. In this position, light bulb 132 is deenergized because the thermostat switch 46 is also in open circuit position when the dial is turned to "off" position. In all other positions of the dial, signal light 132 is energized and gives a steady light by reason of its having a constant current flow through line 134, switch 123 and lead 112. That is, if switch 123 were not present, the light signal would either be on constantly, or would have a flasher action by reason of the cycling operation of thermostat 46.

The cooking apparatus is connected to a suitable source of electrical energy, such as the conventional 220 v. line which supplies sufficient current to obtain maximum high heat intensity for both inner and outer surface unit rings 32, 34 when used together.

In operation of my control 30, if it is desired to use only the inner ring 32, the knob 52 is turned in a direction to rotate cams 76 and 78 in a counterclockwise direction facing Fig. 4. Rotation of cam 76 counterclockwise forces spring follower 80 out of cam notch 82 and tensions spring 68 which initiates operation of thermostat 46. The position of the knob and corresponding tension on spring 68 determines cycling time of the thermostat and therefore the heat intensity maintained at the inner ring 32. Tensioning of spring 68 moves contact 60 into engagement with contact 58 which completes the circuit to the inner heating element 32 and to thermostat heater 66 since contacts 129 and 130 have been previously closed by rotation of cam carrier 74. As heater 66 affects or increases the temperature of bi-metal blade 54, the blade bends and parts contacts 58 and 60 thus opening the circuit of the surface heating element 32 and the thermostat heater 66 and, of course, as the bi-metal blade cools it returns the contacts 58 and 60 into engagement. This cycling of the thermostat continues and the period of cycling determines the overage wattage input to element 32 necessary to obtain the desired heat at the element 32. Higher heat intensities are obtained by rotating cam 76 further in a counterclockwise direction which further tensions spring blade 62 requiring more heat and consequently time for the thermostat heater 66 to part the contacts 58 and 60. If cam 76 is rotated such that the high point 106 thereof engages spring 68, contacts 58 and 60 remain engaged as the limits of the bi-metal blade are insufficient to part them and thus maximum high heat is obtained at the surface unit. During rotation of the cams in counterclockwise direction, the cam follower of cam 78 rides on the low or ineffective surface of the cam so that switch 48 remains open, as shown for example in Fig. 4.

When it is desired to use or energize both heating element rings 32 and 34, the knob 52 is rotated from "off" position clockwise, facing Fig. 4, to the position desired which tensions spring 68 accordingly and closes switch 48 to close the circuit of outer ring 34 because switch 123 is already closed. The circuit through ring 34 when cam follower 74 is moved in clockwise position is line 112, switch 123, ring 34, line 120, switch 48, line 118, thermostat 46, contacts 58 and 60, blade 62, and line 110. Also at this time the circuit through ring 32 is line 112, switch 123, line 122, ring 32, line 114, heater 66, thermostat 46, contacs 58 and 60, blade 62, and line 110. Thus the rings 32 and 34 are in parallel circuit relationship. It will therefore be noted that it is possible to energize ring 32 alone or rings 32 and 34 simultaneously with rings 32 and 34 being in parallel circuit relationship. The thermostat 46 now functions to maintain the selected heat intensity, for both heating elements 32, 34 and cam 78 holds switch 48 closed throughout the range of setting of thermostat 54 by cam 76. It will be understood that when cams 78, 76 are rotated in either direction, switch 123 is closed to complete the circuit through the inner ring 32 or both rings 32, 34, as the case may be, and signal light 132 is also energized. Also, the follower on indexing mechanism 126 engages in the indexing notches 124 to aid the user in locating the heat setting desired.

From the foregoing, it will be noted that I have provided in an electric circuit for electric ranges a new and improved system of control wherein the user of the range may at will selectively control the inner surface heating unit alone or the inner and outer surface heating units simultaneously and that the control thereof is under a single thermostat connected in the electric circuit to provide infinite control by cyclic operation of the units whether they are in operation as a single unit or combined and this single thermostat is controlled by an electric heater element which is also connected in a circuit with the thermostat so that the heater controls the thermostat under either or both types of operations of said units. It will also be noted that the cycling of the units is controlled by the heater which is in circuit with one surface unit only to thereby establish uniform control whether the units are in operation as a single unit or combined. It will also be understood that I have provided a new and improved control system for electric range surface heat elements by means of which a user may at will set the control to select any of an infinite number of heat intensities between low and high heat intensity limits and at the same time select to use either the inner ring alone or both rings simultaneously of the heating unit. It will also be noted that I have provided an improved surface unit heat control of a character such that infinite heat settings within the adjustment range thereof may be had for either the inner or both heat rings. In addition, I have provided a control of the character described having an improved arrangement of several switches thereof including an element arrangement to perform the multiple functons of safety line switch, signal control switch, and switch position indexing mechanism.

Although only a preferred form of the invention has been illustrated, and that form described in detail, it will be apparent to those skilled in the art that various modifications may be made therein without departing from the spirit of the invention or from the scope of the appended claims.

I claim:

1. In electrical cooking range having inner and outer surface unit heat elements, a control device comprising, a casing, a thermostatic switch within said casing, a heater operable to influence said thermostatic switch and in circuit only with said thermostatic switch and the inner element, spring means opposing operation of said thermostatic switch by said heater, cam means operable to vary the tension of said spring means to change correspondingly the heat intensity of the inner or both elements, a knob to rotate said cam, a second cam within said casing and rotatable by said knob, and a manual switch operable by said second cam to deenergize the outer ring upon rotation of the knob in one direction and in series circuit only with said thermostatic switch and the outer element.

2. In an electric cooking range, a surface cooking unit inner section to accommodate small pans, an outer section cooperable with the first section to accommodate larger pans, said sections having substantially the same electric resistance and connected in parallel circuit, a cycling thermostatic switch connected in series circuit with each of said sections, a manual switch in series with said thermostatic switch and outer section operable to cut-in or cut-out said outer section, and a resistance heater positioned in heat exchange relation with said thermostatic switch to influence the cycling operation thereof, said resistance heater being connected in series circuit relation solely with said thermostatic switch and said inner section irrespective of operation of said manual switch.

References Cited in the file of this patent
UNITED STATES PATENTS

| | | |
|---|---|---|
| 2,122,650 | Keene | July 5, 1938 |
| 2,210,947 | Myers et al. | Aug. 13, 1940 |
| 2,276,930 | Clark | Mar. 17, 1942 |
| 2,409,434 | Jacobs | Oct. 15, 1946 |
| 2,434,467 | McCormick | Jan. 13, 1948 |
| 2,435,530 | Candor | Feb. 3, 1948 |
| 2,498,127 | Kuhn | Feb. 21, 1950 |
| 2,648,755 | Vogelsberg | Aug. 11, 1953 |
| 2,666,124 | Vogelsberg | Jan. 12, 1954 |